(12) United States Patent
Gary et al.

(10) Patent No.: US 9,056,393 B1
(45) Date of Patent: Jun. 16, 2015

(54) LIGHT INSTALLATION POLE

(71) Applicant: Commercial Christmas Clip Company LLC, Lubbock, TX (US)

(72) Inventors: Lonnie F. Gary, Lubbock, TX (US); James C. DeVilliers, Lubbock, TX (US); Steven L. Fillipp, Lubbock, TX (US)

(73) Assignee: Commercial Christmas Clip Company LLC, Lubbock, TX (US)

( * ) Notice: Subject to any disclaimer, the term of this patent is extended or adjusted under 35 U.S.C. 154(b) by 0 days.

(21) Appl. No.: 14/215,297

(22) Filed: Mar. 17, 2014

Related U.S. Application Data

(60) Provisional application No. 61/793,457, filed on Mar. 15, 2013.

(51) Int. Cl.
| B25B 9/00 | (2006.01) |
| B25J 1/02 | (2006.01) |
| F21S 4/00 | (2006.01) |

(52) U.S. Cl.
CPC ... *B25J 1/02* (2013.01); *F21S 4/001* (2013.01)

(58) Field of Classification Search
USPC ........... 294/210, 209, 100, 111, 115; 81/53.1, 81/53.11
See application file for complete search history.

(56) References Cited

U.S. PATENT DOCUMENTS

| 99,971 | A | * | 2/1870 | Taylor et al. | 294/100 |
| 895,625 | A | * | 8/1908 | Gaynor | 81/53.12 |
| 977,158 | A | * | 11/1910 | Berkstresser | 81/53.11 |
| 1,514,814 | A | * | 11/1924 | Allen | 81/53.11 |
| 2,193,073 | A | * | 3/1940 | Norton | 294/100 |
| 2,616,741 | A | * | 11/1952 | Ziese | 294/111 |
| 3,093,402 | A | * | 6/1963 | Sisson | 294/100 |
| 4,575,143 | A | * | 3/1986 | Nast | 294/65.5 |
| 4,834,760 | A | * | 5/1989 | Richter, Jr. | 623/65 |
| 5,317,939 | A | * | 6/1994 | Marinescu | 81/53.11 |
| 5,407,243 | A | * | 4/1995 | Riemann | 294/100 |
| 5,826,928 | A | * | 10/1998 | Shang | 294/24 |
| 6,106,042 | A | * | 8/2000 | McCloy, Jr. | 294/100 |
| 6,227,584 | B1 | | 5/2001 | Reuther | |
| 6,315,340 | B1 | * | 11/2001 | Chen | 294/24 |
| 6,883,400 | B2 | * | 4/2005 | Sugano | 81/53.11 |
| 7,143,668 | B2 | * | 12/2006 | Johnson et al. | 81/53.1 |
| 7,281,740 | B1 | * | 10/2007 | Fields | 294/100 |
| 7,527,311 | B2 | * | 5/2009 | Shih | 294/100 |
| 7,552,957 | B2 | * | 6/2009 | Bowes | 294/1.3 |
| 8,104,806 | B1 | * | 1/2012 | Shih | 294/24 |
| D675,510 | S | * | 2/2013 | Gary et al. | D8/395 |
| 8,500,180 | B2 | * | 8/2013 | Buzby et al. | 294/111 |
| 8,544,919 | B2 | * | 10/2013 | Oh et al. | 294/209 |
| 2011/0221219 | A1 | * | 9/2011 | Heaton | 294/210 |

* cited by examiner

*Primary Examiner* — Saul Rodriguez
*Assistant Examiner* — Gabriela Puig
(74) *Attorney, Agent, or Firm* — Ross Barnes LLP; Monty L. Ross; Robin L. Barnes

(57) ABSTRACT

An apparatus for installing a string of decorative lighting, such as Christmas or party lights, in an elevated location without requiring the use of a ladder. The apparatus allows the string of lights to be hung simultaneously with a hanging bracket or clip suitable for hanging the lights from a gutter or shingles. A clamp, actuated between an open and closed position, securely holds the light string by a socket rather than the wire string, while the light string is being hung. The clamp preferably includes prongs oriented in different directions, one direction adapted for hanging a string of lights with a hook-type hanging bracket and the other direction adapted for use with a clip-type hanger. A protective body covers the bulb while the light string is being hung.

1 Claim, 7 Drawing Sheets

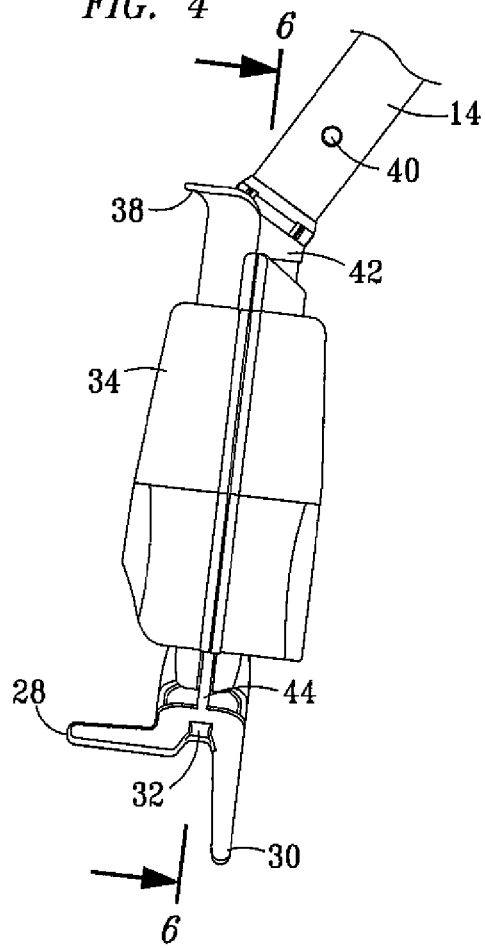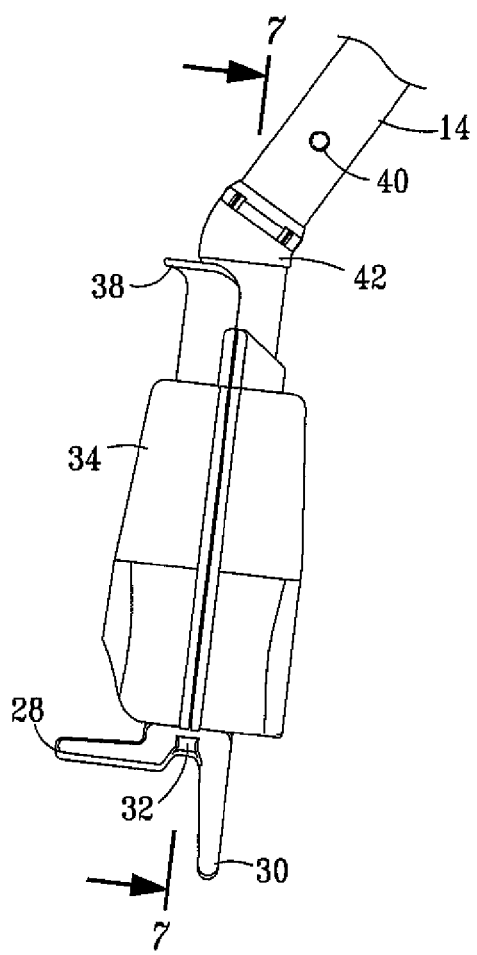

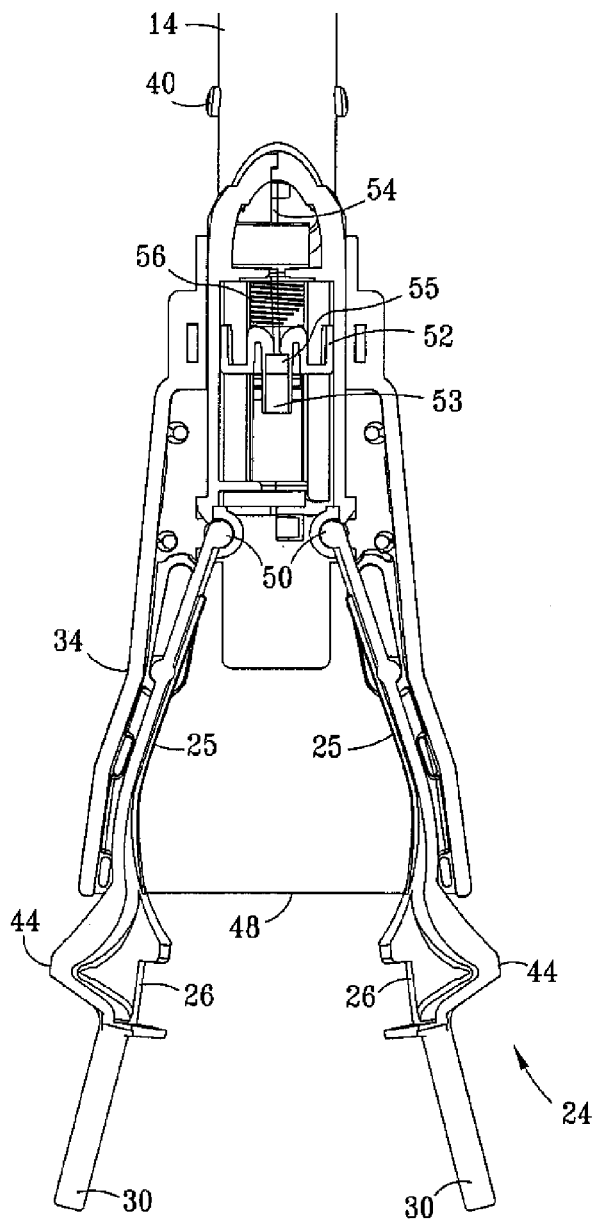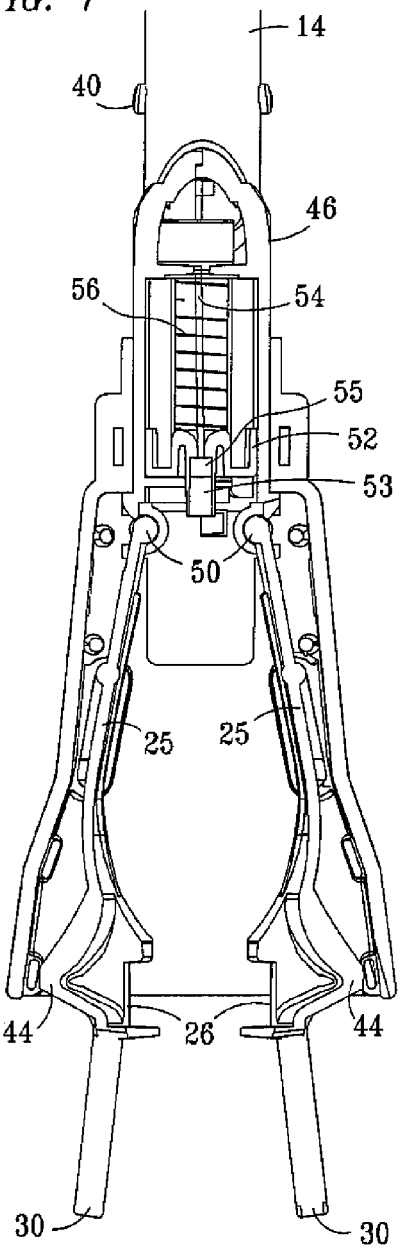

LIGHT INSTALLATION POLE

CROSS REFERENCE TO RELATED APPLICATION

This case claims the benefit of U.S. Provisional application 61/793,457 filed Mar. 15, 2013.

BACKGROUND OF THE INVENTION

1. Field of the Invention

This invention relates to a pole for installing a string of decorative lighting, such as Christmas or party lights, in an elevated location. The pole is particularly useful for hanging light strings using pre-attached hanging clips or brackets that secure the light string to a gutter or to shingles.

2. Description of Related Art

Decorative stringed lights are commonly hung from elevated locations, such as gutters or from shingles. Typically, these lights are manually hung using a ladder, requiring the user to repeatedly climb the ladder to hang a single light on the string, climb down and move the ladder to the next location. This is a tedious and dangerous task. Alternatively, these lights may be hung with the assistance of a pole and a hanging adapter. The adapter is generally a two pronged, V-shaped hook that is attachable to common household poles, such as a broom handle or a painter's pole with a threaded end. The V-shaped hook does not securely hold the light string while it is being hung. The light string can slip off the hook, causing the lights to fall and the bulbs to break. Additionally, the V-shaped hook adapter merely hooks onto the string portion of the lights to lift the string to a clip or bracket already in place on the gutter or shingle. While this type of hanging adapter is helpful, its use requires the clips or brackets to already be in place on the gutter or shingles. If they are not already in place, then the user is required to climb the ladder to install them along the length of gutter or building on which the lights are to be hung, which is again tedious and dangerous.

A clamping type hanger, such as that disclosed in U.S. Pat. No. 6,227,584, that is permanently attached to a pole is also known. This hanger has a jaw-like clamp that securely holds the string (wiring) portion of the lights, with the jaw being actuated between an open and closed position by a trigger on the pole handle. This type of hanger may cause damage to the wiring on the light string. Also, like with the V-shaped adapter, this type of hanger is not suitable for hanging a light string on a gutter or from shingles using clips or brackets unless those clips and brackets have already been manually installed using a ladder.

SUMMARY OF THE INVENTION

The light installation pole disclosed herein may be used to simultaneously install a clip or bracket for hanging a light string on a gutter or from shingles and hang the light string, without requiring the user to climb a ladder. In a preferred embodiment, the light installation pole comprises a handle, a pole of suitable length to reach most gutters and lower roof lines from the ground (and preferably a telescoping pole with suitable extendable length), a head, and a clamp for securely holding a light bulb socket with a hanging bracket or clip pre-attached. According to one preferred embodiment, the clamp is selectively positionable between an open position and a closed position by actuation of a trigger disposed on the handle. According to another preferred embodiment, the clamp grasps the socket portion of a light, along with part of a hanging bracket or clip already attached to the light socket on the string of lights rather than grasping the wiring. According to yet another preferred embodiment, the light bulb is inserted inside the head during the hanging operation, providing protection for the bulb. According to yet another preferred embodiment, after a first bulb is hung, the clamp may be used to grasp the socket on subsequent bulbs once they are in an elevated position (because of the wire string attachment to the first bulb that has been hung) without requiring the user to manually insert the socket into the clamp.

These and other features, objects and advantages of the present invention will become better understood from a consideration of the following detailed description of the preferred embodiments and appended claims in conjunction with the drawings.

BRIEF DESCRIPTION OF THE DRAWINGS

The apparatus of the invention are further described and explained in relation to the following drawings wherein:

FIG. 4 is a side elevation view of the head and clamp of FIG. 2;

FIG. 5 is a side elevation view of the head and clamp of FIG. 3;

FIG. 6 is a cross-sectional view of the head and clamp of FIG. 4;

FIG. 7 is a cross-sectional view of the head and clamp of FIG. 5;

DESCRIPTION OF THE PREFERRED EMBODIMENTS

Figure 1:
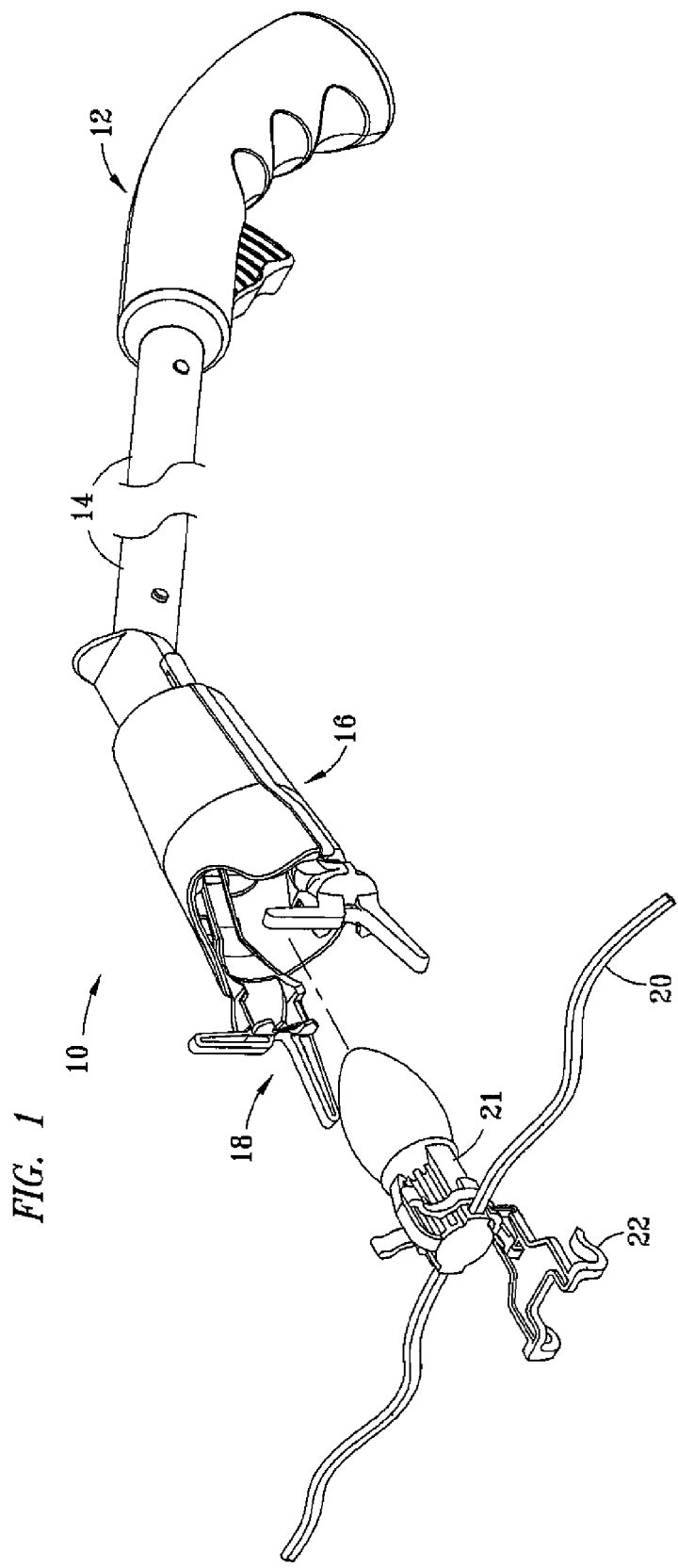
FIG. 1 is a perspective view of a preferred embodiment of a light hanging apparatus according to the invention.

Referring to FIG. 1, one preferred embodiment of a light hanging pole apparatus 10 is depicted. The light hanging pole preferably comprises a handle 12, a pole 14, a head 16, and a clamp 18. Also depicted in FIG. 1, for illustrative purposes, is a portion of a string of decorative lights 20 with a hanging bracket 22 suitable for use in hanging light string 20 from a gutter, for example, pre-attached to the light bulb socket 21. The particular bulb shape and size and hanging bracket depicted are not intended to be limiting and the light hanging pole apparatus 10 of the invention may be used with different bulb shapes and sizes and other types of hanging brackets or clips. Pole 14 may be made from plastic or metal, and is preferably light-weight but sturdy enough to support the weight of head 16, clamp 18, a light bulb and socket 21 from light string 20, and hanging bracket 22 without significantly bowing. Pole 14 is preferably telescoping to aid in ease of use. Head 16 is retracted to allow insertion of the bulb into head 16 and secure the light socket 21 in clamp 18 (as described in greater detail below). For a telescoping pole 14, the pole may be retracted while the bulb is being loaded and then extended to install the bracket 22 in the desired location. Pole 14 is preferably long enough, or has sufficient extendable length, to reach the height of most gutters and rook lines from the ground. Head 16 and clamp 18 are preferably made from plastic but other materials may also be used. Head 16 and clamp 18 are preferably sized to accommodate most decorative bulb shapes and socket sizes; however, they may be made in varying sizes to accommodate extremely large or oddly shaped lights.

Figure 2:
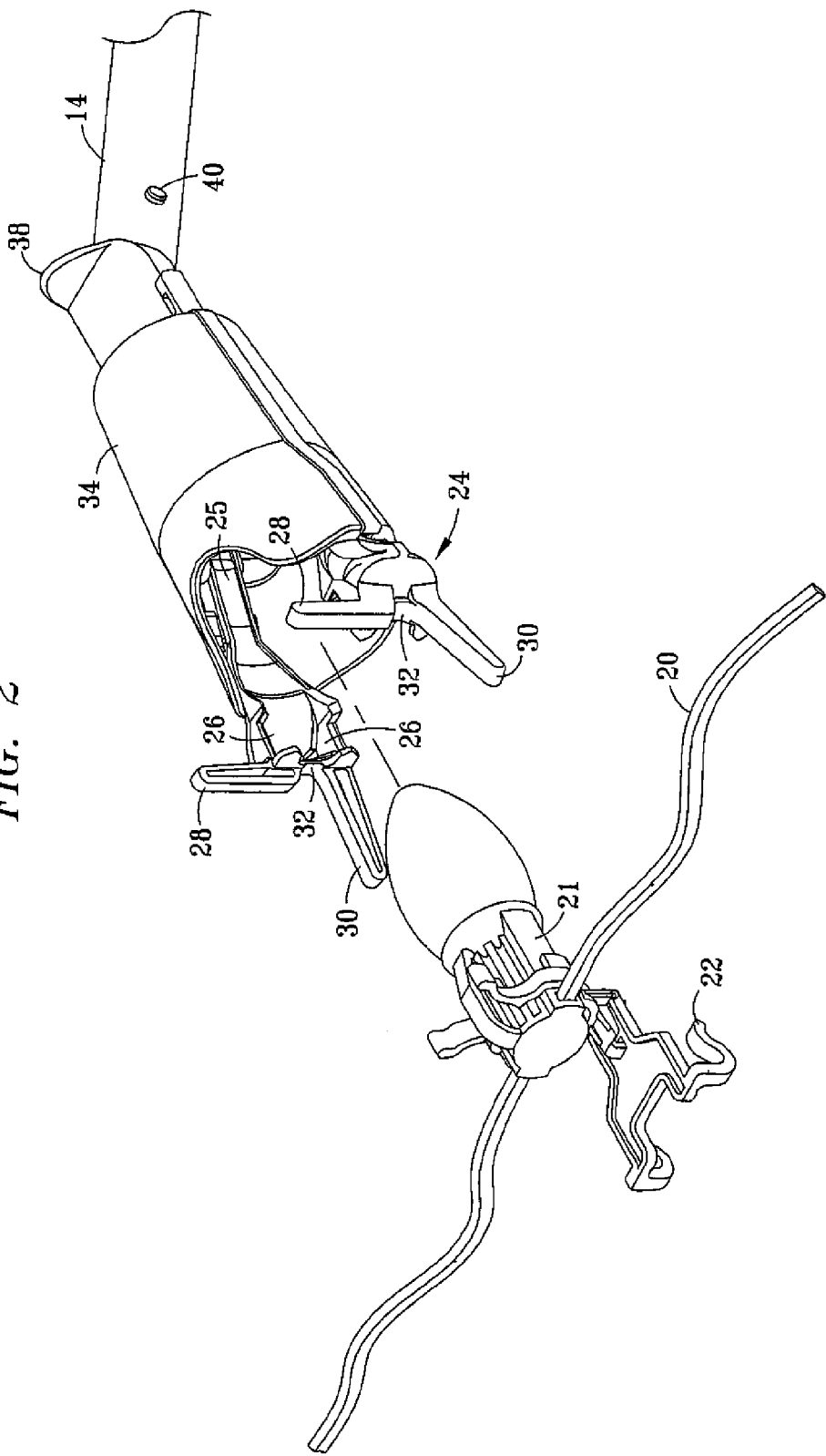
FIG. 2 is a perspective view of a preferred embodiment of the head and clamp, in the open position ready to grasp a portion of a string of lights having a hanging bracket.
Figure 3:
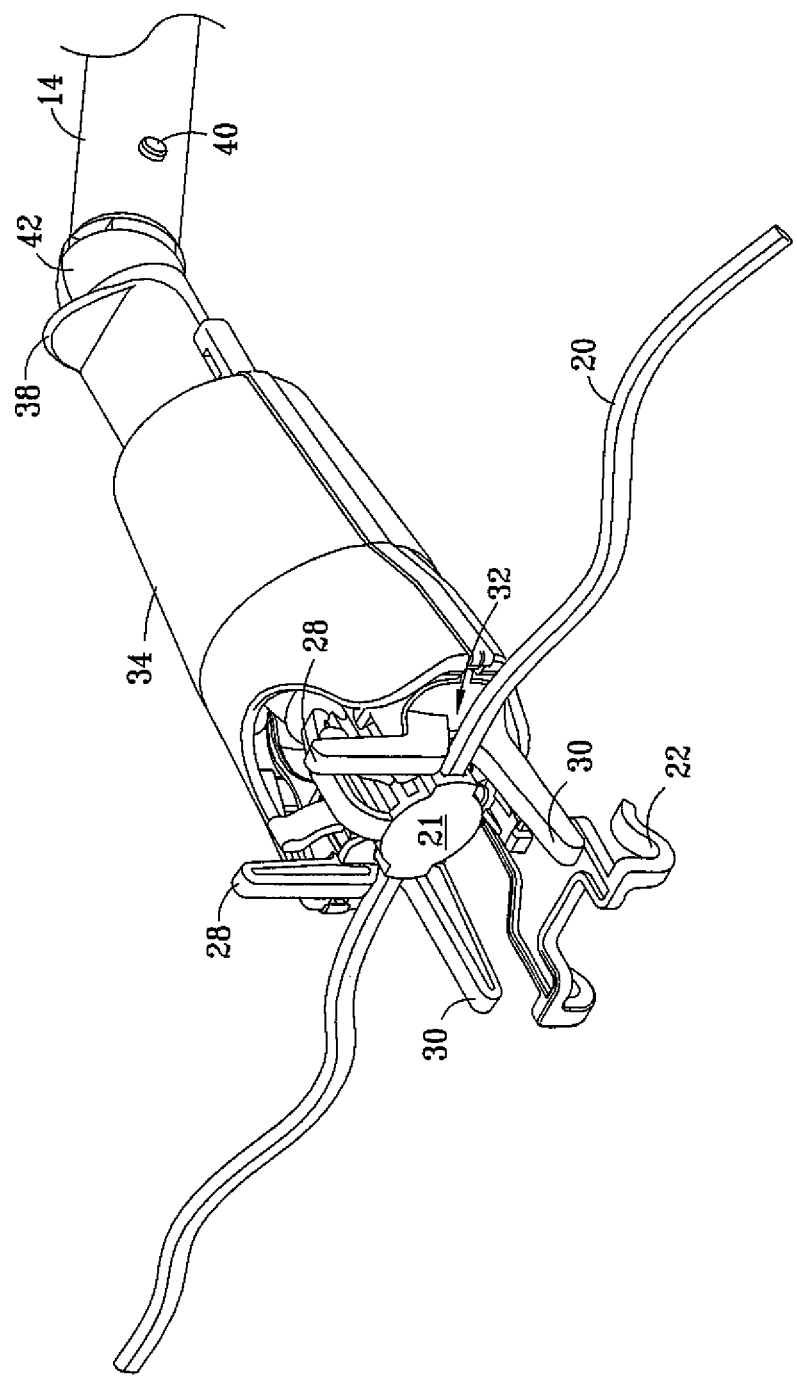
FIG. 3 is a perspective view of the head and clamp of FIG. 2, with the light bulb inserted into the head and the clamp in the closed position.

FIGS. 2-7 depict preferred embodiments of head 16 and clamp 18. Clamp 18 preferably comprises two clamp arms 24 and at least one hinge 50 for connecting clamp 18 to head 16. Preferably, each clamp arm 24 has a hinge 50. FIGS. 2, 4 and 6 depict clamp arms 24 in the open position, ready to have a light bulb and socket 21 inserted. FIGS. 3, 5, and 7 depict clamp arms 24 in the closed position, with the light bulb inserted into body 34, ready to hang this portion of light string 20 by bracket 22. Each clamp arm 24 preferably comprises a longitudinal portion 25, recessed area 26, upper prong 28, lower prong 30, elbow 32, and shoulder 44. Each clamp arm 24 is preferably unitarily molded as a single part, but may be made as separate parts joined together as will be understood by those of ordinary skill in the art. Longitudinal portions 25 are disposed within body 34 substantially along a sidewall of body 34 and spaced apart approximately 180°. Each clamp arm 24 extends forwardly from a hinge 50, which attaches each clamp arm to neck 46.

Head 16 is preferably attached to pole 14 by a pivoting joint 42. A push button 40 may be provided to actuate pivot joint 42. Head 16 preferably comprises body 34, tab 38, pivot joint 42, neck 46, spring cap disk 52 and spring 56. Body 34 is substantially cylindrical, with slight tapering from front to back. Body 34 preferably slidably engages neck 46, allowing body 34 to be disposed in a more forward position (as shown in FIG. 7) or in a more rearward position (as shown in FIG. 6). Tab 38 is optionally provided as a thumb rest or hook to aid in pivoting head 16. Forward-most edge 48 of body 34 is the widest part of body 34 and body 34 narrows as it extends back toward tab 38. Disposed on the interior of body 34 is a spring cap disk 52 at which a string or cable 54 for actuating movement of body 34 terminates. Disk 52 is connected to spring 56. Cable 54 preferably is inserted through a slot or aperture 55 in disk 52 and the end of string 54 is secured with a crimped tubular ferrule 53 to prevent it from slipping back through aperture 55. Alternate configurations for running cable 54 through body 34 and connecting a terminal end of cable 54 to body 34 or another component attached to body 34 may also be used as will be understood by those of ordinary skill in the art. When cable 54 is retracted, it causes disk 52 to compress spring 56, moving and holding body 34 in a rearward or retracted position (as shown in FIG. 6). When cable 54 is relaxed, spring 56 is allowed to expand, pushing against disk 52 and moving and holding body 34 in a forward position (as shown in FIG. 7). Apertures through which cable 54 runs are preferably disposed at periodic lengths along an interior of pole 14 to guide cable 54. Cable 54 is preferably made of nylon monofilament, but other materials may also be used.

When clamp 18 is in the closed position (as depicted in FIG. 7), each clamp shoulder 44 is substantially disposed inside body 34, abutting an interior surface of body 34 adjacent forward-most edge 48. In this way, body 34 holds clamp 18 in the closed position. When clamp 18 is in the open position (as depicted in FIG. 6), clamp shoulders 44 are disposed forwardly of forward-most edge 48 of body 34, allowing clamp arms 24 to spread apart by hinge 50. Hinge 50 is preferably a spring type hinge that forces clamp arms 24 outward if not held in a more closed position by the force of body 34 acting on arms 24, but other configurations allowing arms 24 to pivot between an open and closed position may be used.

Body 34 and clamp arms 24 (particularly when clamp 18 is in the closed position) are sized to accommodate most bulb shapes and sizes without any portion of body 34, or clamp 18, having to contact the bulb once it is inserted into body 34 and being hung. The bulb is protected while inside body 34 and will not be damaged by contact with the structure from which light string 20 is being hung during the hanging operation. Recessed areas 26 on each clamp arm 24 cooperate to grasp socket 21 when clamp 18 is in the closed position. The string or wire on light string 20 rests on elbows 32, to hold the string out of the way so that it does not interfere with hanging the bracket 22. Apparatus 10 does not hold or grasp light string 20 by the string or wire, so there is no risk of damaging the wiring. Upper prong 28 and lower prong 30 extend forwardly of recessed area 26 and shoulder 44 on each clamp arm 24. Upper prong 28 is disposed relative to lower prong 30 at an angle of approximately 90°, with lower prong 30 being substantially in-line with longitudinal portions 25, head 16, and pole 14 (when head 16 is not pivoted out of line with pole 14). Lower prong 30 is most useful with hook-type hanger for gutter installations, such as bracket 22 that depicted in FIGS. 2-3. When a light bulb is loaded into apparatus 10 for hanging, the hooks of bracket 22 being disposed on the outer side of lower prong 30 (with elbow 32 being disposed on the inside of lower prong 30, for reference). The clip-type hanger typically used with shingle-type installations, such as that depicted in U.S. Design Patent D675,510, does not have the hooks on the back like bracket 22. Upper prong 28 is most useful with a clip-type hanger for shingle installations. When installing that type of clip, the clip portion would be disposed on the outer side of upper prong 28 (again with elbow 32 being disposed on the inside of upper prong 28, for reference). Depending on which type of hanger is being installed, apparatus 10 is rotated so that the appropriate prong, either upper prong 28 or lower prong 30, is oriented closest to the location where light string 20 is to be hung.

Figure 8:
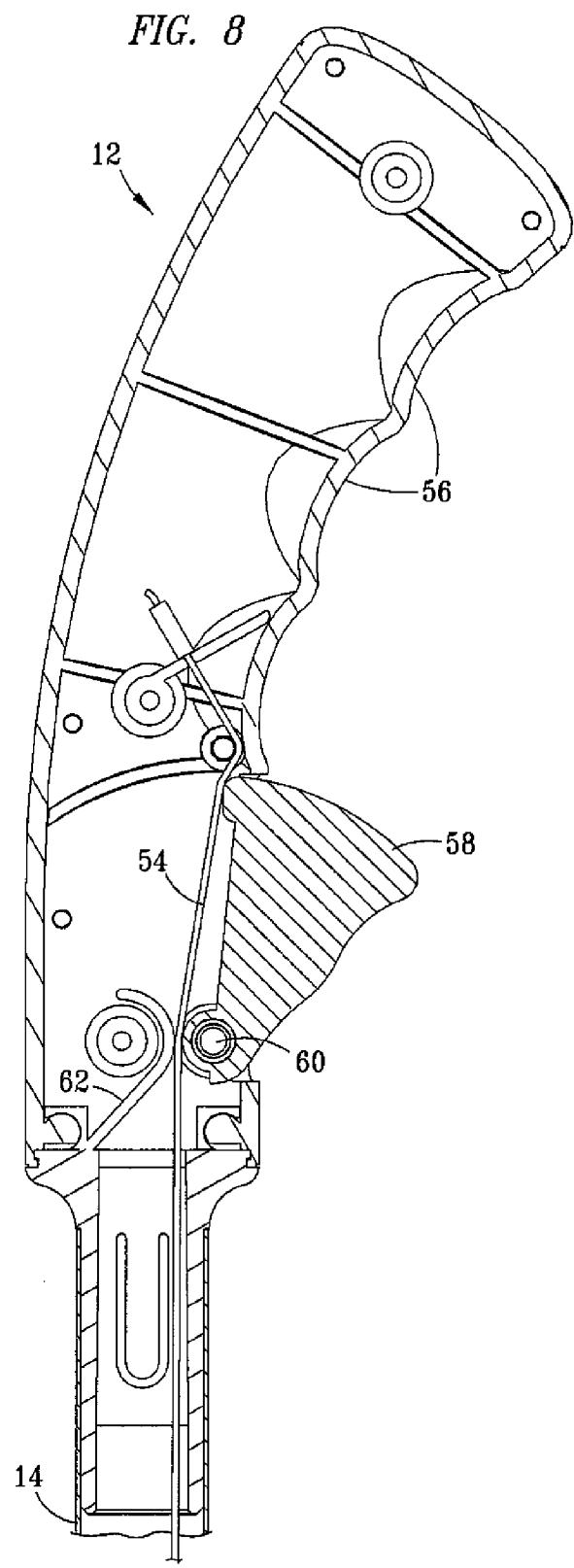
FIG. 8 is a cross-sectional side elevation view of a preferred embodiment of the handle with the trigger in the released position.
Figure 9:
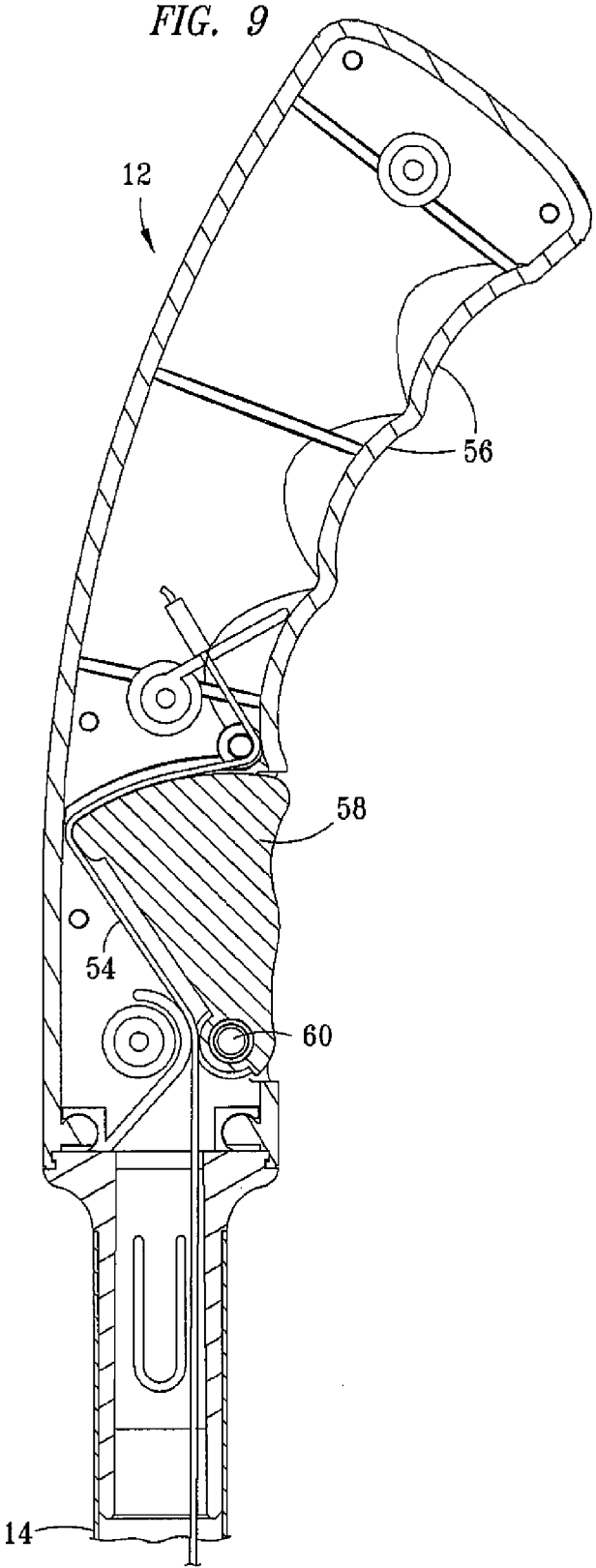
FIG. 9 is a cross-sectional side elevation view of a preferred embodiment of the handle with the trigger in the retracted position.

A preferred embodiment of handle 12 is depicted in FIGS. 8 and 9. Handle 12 preferably comprises an actuator or trigger 58, finger grips 57, a trigger hinge or pivot joint 60, and string guide 62. Actuator or trigger 58 actuates the opening and closing movement of the clamp 18. Cable 54 passes between guide 62 and over trigger 58. When actuator or trigger 58 is in the retracted or depressed position (as shown in FIG. 9), cable 54 is retracted causing body 34 to be in the rearward position and clamp 18 to be open (as shown in FIG. 6). When trigger 58 is in the released position (as shown in FIG. 8), cable 54 is relaxed allowing body 34 to be in the forward position and clamp 18 to be closed (as shown in FIG. 7). Those of ordinary skill in the art will appreciate that the orientation of clamp 18 as opened or closed relative to trigger 18 being depressed or released may easily be reversed. Additionally, those of ordinary skill in the art will appreciate the modifications to apparatus 10 necessary to have cable 54 connected directly to clamp 18, with body 34 being stationary and clamp 18 sliding in and out of body 34, to actuate opening and closing. Other methods and structure for actuating the opening and closing of clamp 18 will also be understood by those of ordinary skill in the art.

To hang a portion of light string 20, clamp 18 should first be in the open position as depicted in FIG. 2. Trigger 58 is depressed or retracted, which retracts cable 54 causing compression of spring 56 which causes body 34 to slide rearwardly toward pole 14 and clamp arms 24 to spread apart, opening clamp 18. The user grasps light string 20 by the rear of socket 21 (closest to the wire or string) or by bracket 22 and inserts the bulb into body 34 between arms 24, with bracket 22 being on the outer side of lower prong 30 and the string or wire of light string 20 resting on elbow 32. Once the light is inserted, trigger 58 is released, which causes cable 54 to relax and spring 56 to expand, which causes body 34 to slide forwardly to close clamp arms 24 so that recessed areas 26 grasp the socket 21 and a portion of the bracket 22. Most preferably, if pole 14 is a telescoping pole, it is in a retracted position while the light is being loaded so that a single user can easily use one hand to load the light and the other hand to depress and release trigger 58. After the light is loaded and clamp 18 is closed, pole 14 is extended to the appropriate length to reach the location where the light will be hung. The hooks on bracket 22 are hung over the lip of a gutter, for example, and trigger 58 is again depressed, which causes cable 54 to retract and body 34 to slide rearwardly so that clamp arms 24 spread apart releasing socket 21. The pole 14 is then moved slightly, so that head 16 and clamp 18 are moved away from the hanging area, pole 14 is then retracted again and another light bulb is loaded. Most preferably, the second bulb to be hung is located five or six bulbs down the string from the first bulb, repeating the steps above. The user then goes back and repeats the process for the five or six bulbs in between, only the user is not required to manually insert socket 21 and the bulb into head 16 since they are already at an elevated height. One of the advantages of apparatus 10 is that it allows the user to grasp socket 21 solely using clamp 18 without requiring the user to manually insert socket 21 or the bulb into head 16 for hanging the set of intermediate bulbs. The process is repeated until all of the desired light string is hung.

References to front (or forward) and rear (or back) herein generally refer to the direction when the light hanging apparatus 10 is being used to hang a portion of lights string 20. In use, the end with handle 12 is in the rear direction and the end with clamp 18 is in the forward direction. Those of ordinary skill in the art will also appreciate upon reading this specification and the description of preferred embodiments herein that modifications and alterations to the apparatus and methods may be made within the scope of the invention and it is intended that the scope of the invention disclosed herein be limited only by the broadest interpretation of the appended claims to which the inventor is legally entitled.

We claim:
1. An apparatus for hanging a string of decorative lights with a hook-type or a clip-type hanger pre-attached to one or more sockets on the string of lights, the apparatus comprising:
   a pole;
   a clamp disposed at a first end of the pole, the clamp comprising two arms, each arm comprising a recessed area and first and second prongs, wherein the second prong is substantially perpendicular to the first prong;
   an actuator disposed at a second end of the pole for actuating opening and closing movement of the clamp; and
   a body having an interior area;
   wherein the recessed areas cooperate to grasp the socket on the string of lights to be hung when the clamp is closed;
   wherein the interior area is configured to receive a light bulb when the recessed areas are grasping the socket;
   wherein each arm is connected to a hinge and wherein the apparatus further comprises a cable connected to the actuator and to the body to cause the body to slide relative to the arms in response to actuation of the actuator; and
   wherein the hinges permit the arms to be in an open state when the body is in one position and permit the arms to be in a closed state when the body is in a second position.

\* \* \* \* \*